Aug. 4, 1936.  W. H. WEBSTER  2,049,789

FLOAT FOR FISHING NETS AND THE LIKE

Filed July 6, 1935

Inventor:
W H Webster

Patented Aug. 4, 1936

2,049,789

UNITED STATES PATENT OFFICE 2,049,789

FLOAT FOR FISHING NETS AND THE LIKE

William Hyde Webster, Grimsby, England

Application July 6, 1935, Serial No. 30,130
In Great Britain July 26, 1934

1 Claim. (Cl. 43—50)

This invention relates to floats for lifting or supporting the head ropes of otter trawls and other fishing nets and for like purposes and of the kind comprising a metal shell of spherical or ball form filled with compressed air or other suitable fluid.

The object of the invention is to prevent the ropes attached to the trawl (such as quarter ropes or leach lines, etc.) from interfering with the float itself.

Such floats are usually attached by means of lugs to the head line or head rope of the trawl. It is a common practice among fishermen when hauling the trawl to pass the quarter ropes or leach lines over the top of the head line. The quarter ropes or leach lines often become jammed against the float, and the latter is damaged by the breaking of the lugs, or the float is lost through the fastenings giving way. It has been found that this can be avoided by properly positioning the lugs of the float.

The present invention consists in a metal float of the kind referred to, having two lugs placed apart from each other in such a way that their end surfaces are respectively situated substantially in planes tangential to the ends of a diameter of the float.

The lugs have of course holes through which attaching cords may be passed for fixation to the head line of the trawl. The float may be made of any suitable metal such as steel, steel alloys, copper or aluminium alloys, etc.

Figure 1:
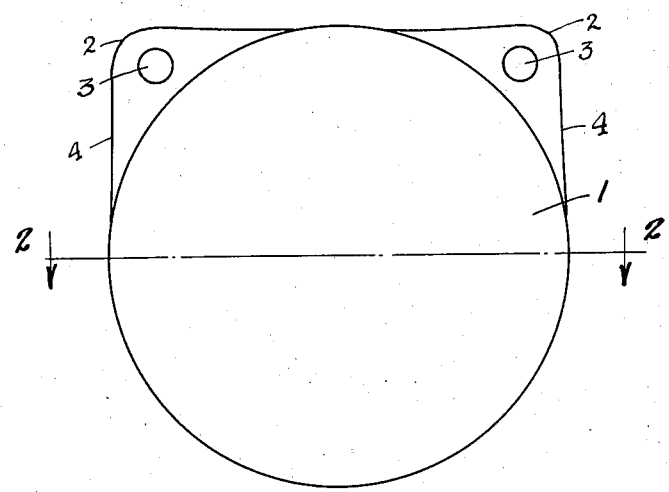

In Figure 1 of the accompanying drawing, 1 is a spherical metal float, 2 are the lugs, 3 are the holes for the attaching cords. It will be seen that the sides 4 of the two lugs 2 are respectively situated in planes substantially tangential to the two ends of one and the same diameter of the spherical float.

Figure 2:
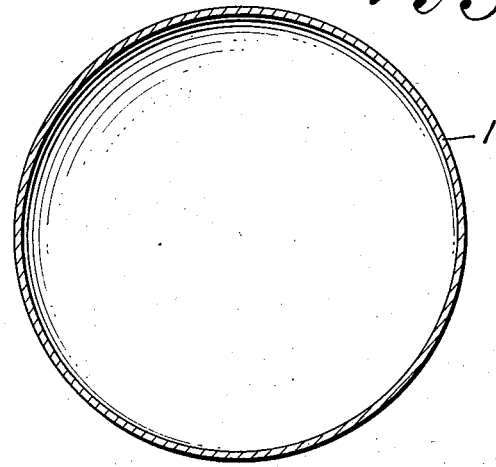

Fig. 2 is a cross-section through the float body.

I claim:

A metal float comprising a metal shell of spherical or ball form filled with compressed air or other suitable fluid and having two lugs placed apart from each other in such a way that their end surfaces are respectively situated substantially in planes tangential to the ends of a diameter of the float.

WILLIAM HYDE WEBSTER.